US009021883B2

(12) United States Patent
Wang

(10) Patent No.: US 9,021,883 B2
(45) Date of Patent: May 5, 2015

(54) PRESSURE GAUGE

(71) Applicant: Ru-Wen Wang, Tainan (TW)

(72) Inventor: Ru-Wen Wang, Tainan (TW)

( * ) Notice: Subject to any disclaimer, the term of this patent is extended or adjusted under 35 U.S.C. 154(b) by 237 days.

(21) Appl. No.: 13/855,723

(22) Filed: Apr. 3, 2013

(65) Prior Publication Data
US 2014/0299044 A1     Oct. 9, 2014

(51) Int. Cl.
*G01L 7/08* (2006.01)

(52) U.S. Cl.
CPC ....................... *G01L 7/084* (2013.01)

(58) Field of Classification Search
CPC ........................................ G01L 7/084
USPC ............................. 73/700; 116/271
See application file for complete search history.

(56) References Cited

U.S. PATENT DOCUMENTS

| 3,874,242 | A | * | 4/1975 | Csaposs et al. | ............... 73/866.1 |
| 3,975,959 | A | * | 8/1976 | Larkin | ............................ 73/744 |
| 4,347,744 | A | * | 9/1982 | Buchanan | ........................ 73/715 |
| 5,753,821 | A | * | 5/1998 | Chou | ................................ 73/715 |
| 5,966,829 | A | * | 10/1999 | Lia et al. | .......................... 33/556 |
| 6,422,086 | B1 | * | 7/2002 | Dromms et al. | ................ 73/715 |
| 8,347,725 | B2 | * | 1/2013 | Yu et al. | ........................... 73/723 |
| 8,535,233 | B2 | * | 9/2013 | Wawro et al. | ................. 600/499 |

* cited by examiner

*Primary Examiner* — Michael Zarroli

(57) ABSTRACT

A pressure gauge includes a base including an annular flange and a pipe for gas flow; a ring on the flange; an uneven pressure measuring member on the ring; a moveable assembly including a seat, a hollow insert, and a shaft wherein the seat is secured to the pressure measuring member, the insert includes two opposite, internal, upper projections, the insert is fastened in the seat, the shaft includes external threads secured to the projections, an upper annular groove, a top protrusion, and an axis projects upward from the protrusion; a pointer secured to the axis; a covering member includes a ring member on the pressure measuring member, and a bridge crossing the ring member and allowing the axis to pass through, and a bent member; a balance spring in the groove and fastened in the bent member; a scale on the bridge; a housing; and a transparent cover.

16 Claims, 8 Drawing Sheets

PRESSURE GAUGE

BACKGROUND OF THE INVENTION

1. Field of the Invention

The invention relates to pressure measuring instruments and more particularly to a pressure gauge with improved characteristics.

2. Description of Related Art

Pressure gauges are widely employed in industries and daily life. For example, a pressure gauge can measure fuel pressure, atmospheric pressure, vacuum, atmospheric pressure in high altitude, or underwater pressure.

A conventional pressure gauge 1 is shown in FIG. 1 and comprises a base 10, a pressure measuring member 11 slightly above the base 10, a scale 12 supported by a raised member (not numbered) and further above the pressure measuring member 11, a hollow shaft 13 centered the pressure measuring member 11 and below the scale 12, a torsion spring 130 put on the shaft 13, a spindle 140 having a lower end disposed in the hollow shaft 13 and an upper end passing through a central opening of the scale 12, a spring actuated rotating member 14 rotatably put on the spindle 140, a lateral rod 15 put on the spindle 140 and biased by an upper end of the torsion spring 130, a screw 120 threadedly secured the scale 12 to an upper support 16 which has one portion engaged the upper sharp end of the spindle 140, a balance spring 141 around and secured to the rotating member 14, a spring actuated pointer 18 having one end rotatably secured to the rotating member 14, and a transparent cover 17 secured to a cylindrical housing (not numbered) which is mounted onto the base 10 so as to construct the pressure gauge 1.

However, the conventional pressure gauge 1 suffers a couple of disadvantages. In detail, the pointer 18 rotates irregularly and is no easy to reset for calibration. Thus, the need for improvement still exists.

SUMMARY OF THE INVENTION

It is therefore one object of the invention to provide a pressure gauge comprising a base comprising an annular flange and a pipe for gas flow toward a bottom of the base; a padded ring rested upon the flange; a pressure measuring member having an uneven surface and pressed on the padded ring; a moveable assembly comprising a seat, a hollow insert, and a shaft wherein the seat is secured to a central portion of the pressure measuring member, the insert includes two opposite projections on a circular wall of a top opening, the insert is fastened in the seat, the shaft includes external threads threadedly secured to the projections, an annular groove on an upper portion, a curved protrusion on a top, and an axis projects upward from the protrusion; a pointer having one end secured to an upper portion of the axis; a covering member comprises a ring member pressed on a peripheral portion of the pressure measuring member, and a raised bridge interconnecting opposite portions of the ring member and including a central through hole for allowing the axis to pass through, and a bent member; a balance spring disposed in the annular groove and having one end fastened in the bent member; a scale comprising a center hole aligned with the central through hole, the scale being rested upon the raised bridge; a housing; and a transparent cover secured to the housing for receiving the base, the padded ring, the pressure measuring member, the moveable assembly, the pointer, the covering member, the balance spring, and the scale.

The above and other objects, features and advantages of the invention will become apparent from the following detailed description taken with the accompanying drawings.

DETAILED DESCRIPTION OF THE INVENTION

Figure 1:
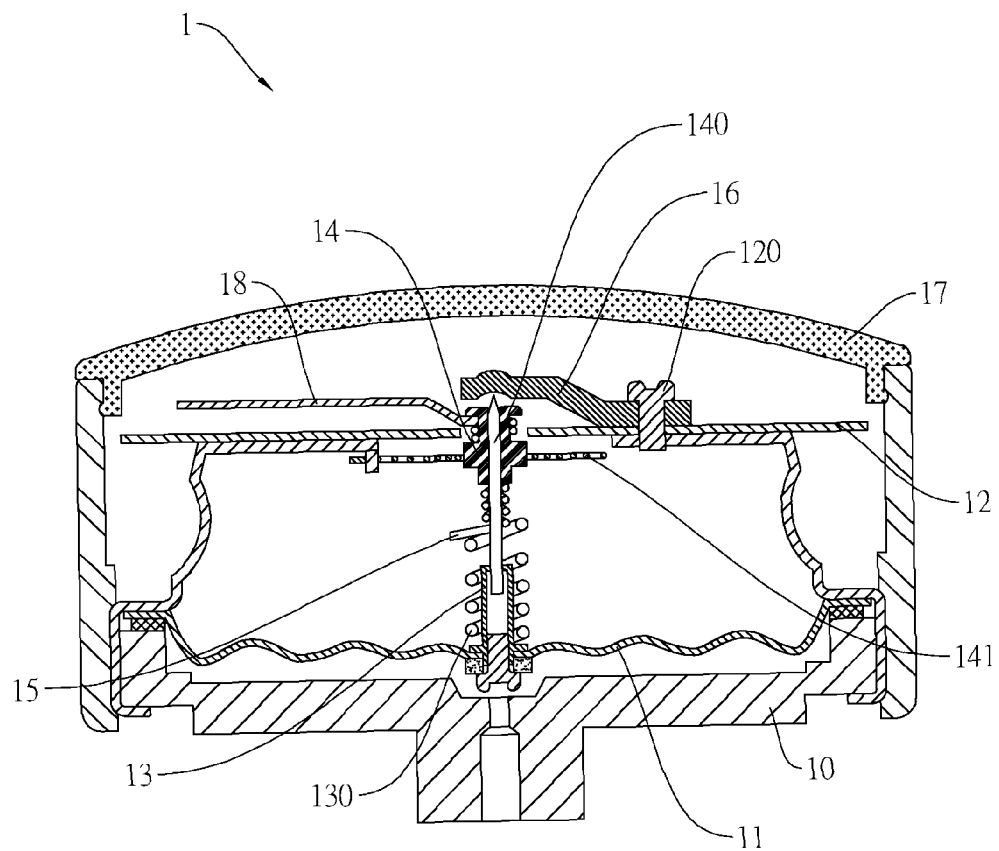
FIG. 1 is a longitudinal sectional view of a conventional pressure gauge.
Figure 2:
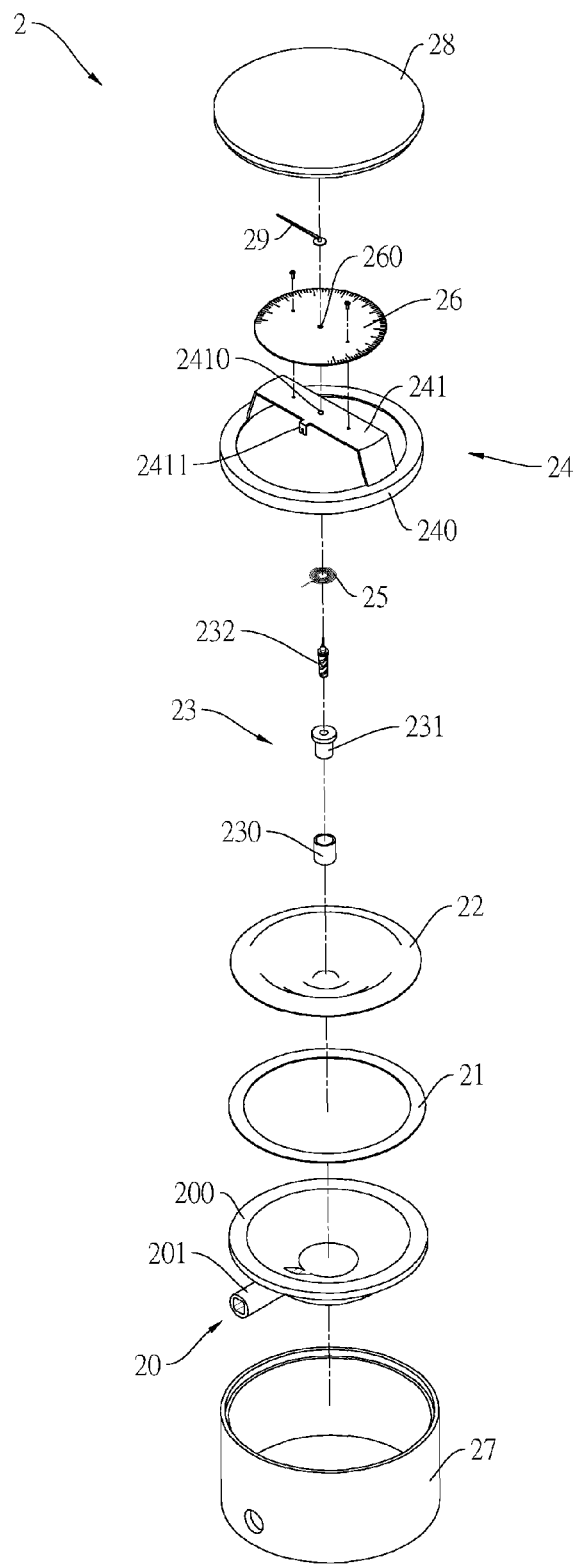
FIG. 2 is an exploded view of a pressure gauge according to a first preferred embodiment of the invention.
Figure 3:
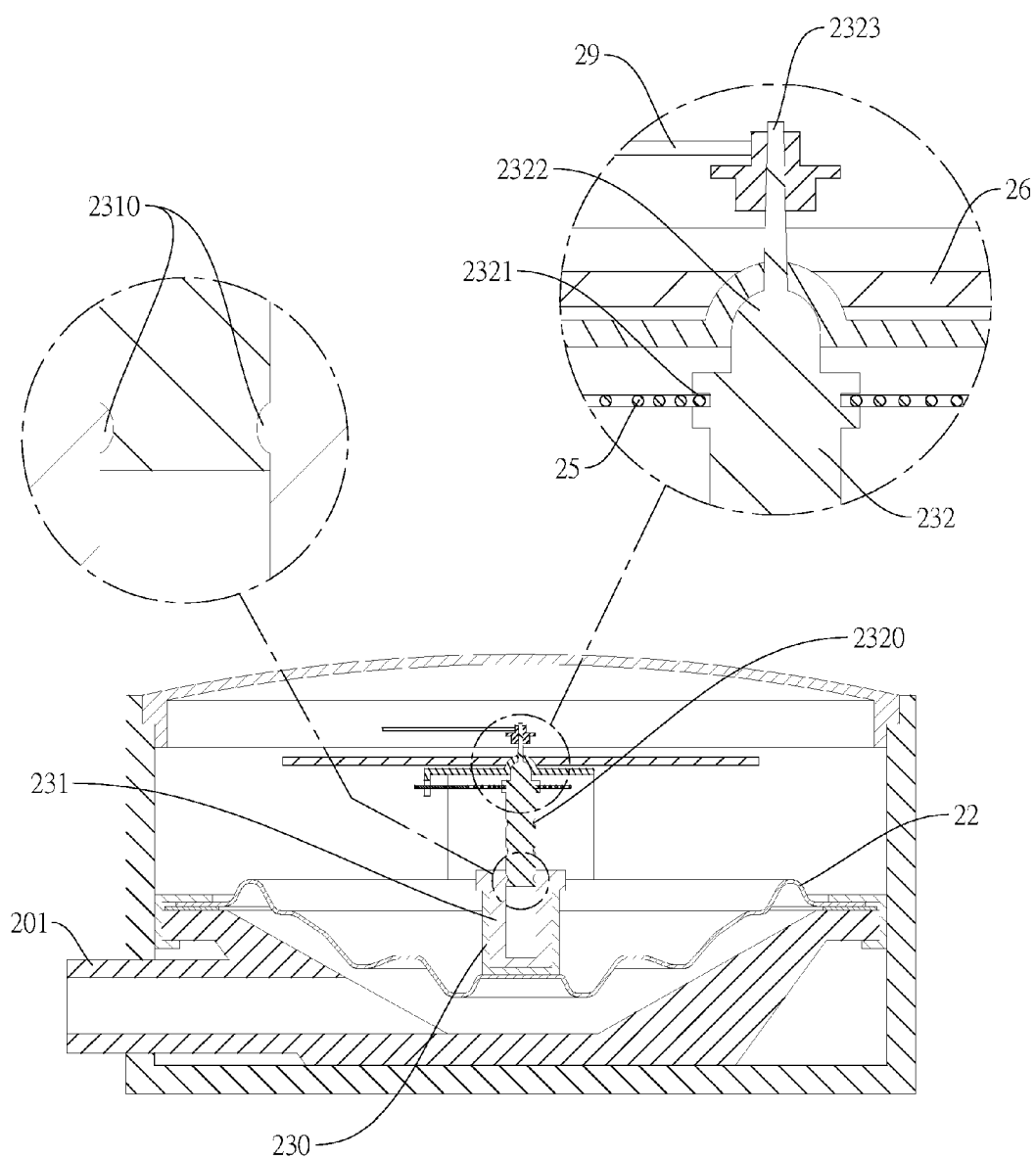
FIG. 3 is a longitudinal sectional view of the pressure gauge of the invention.

Referring to FIGS. 1 to 4, a pressure gauge 2 in accordance with a first preferred embodiment of the invention comprises the following components as discussed in detail below.

A bowl shaped base 20 comprises an annular flange 200 and a pipe 201 for air flow laterally extending from a bottom of the base 20 and through the base 20. A padded ring 21 is rested upon the flange 200. A pressure measuring member 22 is shaped as a disc shaped diaphragm having an uneven surface and pressed on the ring 21 to be above the base 20.

A moveable assembly 23 comprises a cup shaped seat 230, a hollow insert 231 made of plastic, and a shaft 232. The seat 230 is secured to a central portion of the pressure measuring member 22. The insert 231 is provided with two opposite projections 2310 on a circular wall of a top opening. The insert 231 is fastened in the seat 230. External threads (e.g., double-threaded) 2320 are formed on the shaft 232 and adapted to threadedly secure to the projections 2310. An annular groove 2321 is formed on an upper portion of the shaft 232. Top of the shaft 232 is formed with a curved protrusion 2322. An axis 2323 projects upward from the protrusion 2322. A pointer 29 has one end secured to an upper portion of the axis 2323.

A ring shaped covering member 24 comprises a ring member 240 pressed on a peripheral portion of the pressure measuring member 22, and a raised bridge 241 interconnecting opposite portions of the ring member 240 and including a central through hole 2410 for allowing the axis 2323 to pass through, and a bent member 2411. A balance spring 25 is disposed in the groove 2321 and has one end fastened in the bent member 2411. A scale 26 comprises a center hole 260 aligned with the through hole 2410. The scale 26 is rested upon the bridge 241. A cylindrical housing 27 is provided to receive the base 20, the covering member 24, etc. A disc shaped, slightly upward raised transparent cover 28 is secured to a top edge of the housing 27 to receive above components and this completes the construction of the pressure gauge 2.

Figure 4:
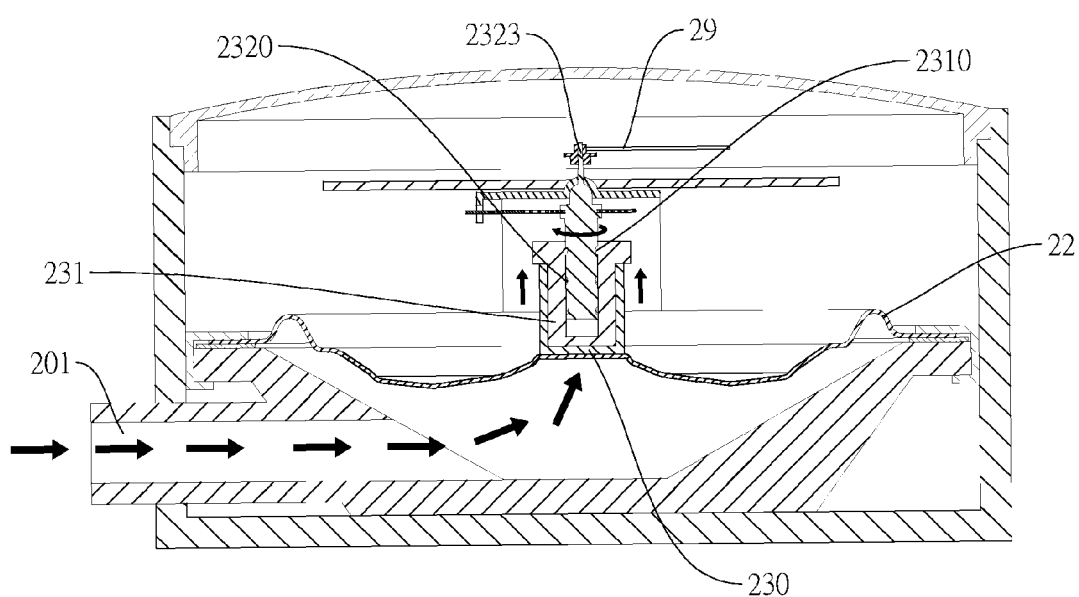
FIG. 4 is a view similar to FIG. 3 showing air drawn into the pressure gauge and shaft rotating in a pressure measuring operation.

As shown in FIG. 4 specifically, air may flow into the pressure gauge 2 along the pipe 201 as indicated by arrows.

Air pressure may deform the flexible pressure measuring member 22. Thus, both the seat 230 and the insert 231 move upward as indicated by two upward directed arrows. And in turn, the projections 2310 move upward along the external threads 2320 to rotate the shaft 232, the axis 2320, and the pointer 29. Pivotal angle of the pointer 29 from the pointer 29 at a position before the pressure measuring operation to the pointer 29 at a position during the pressure measuring operation is proportional to the air pressure being measured.

Figure 5:
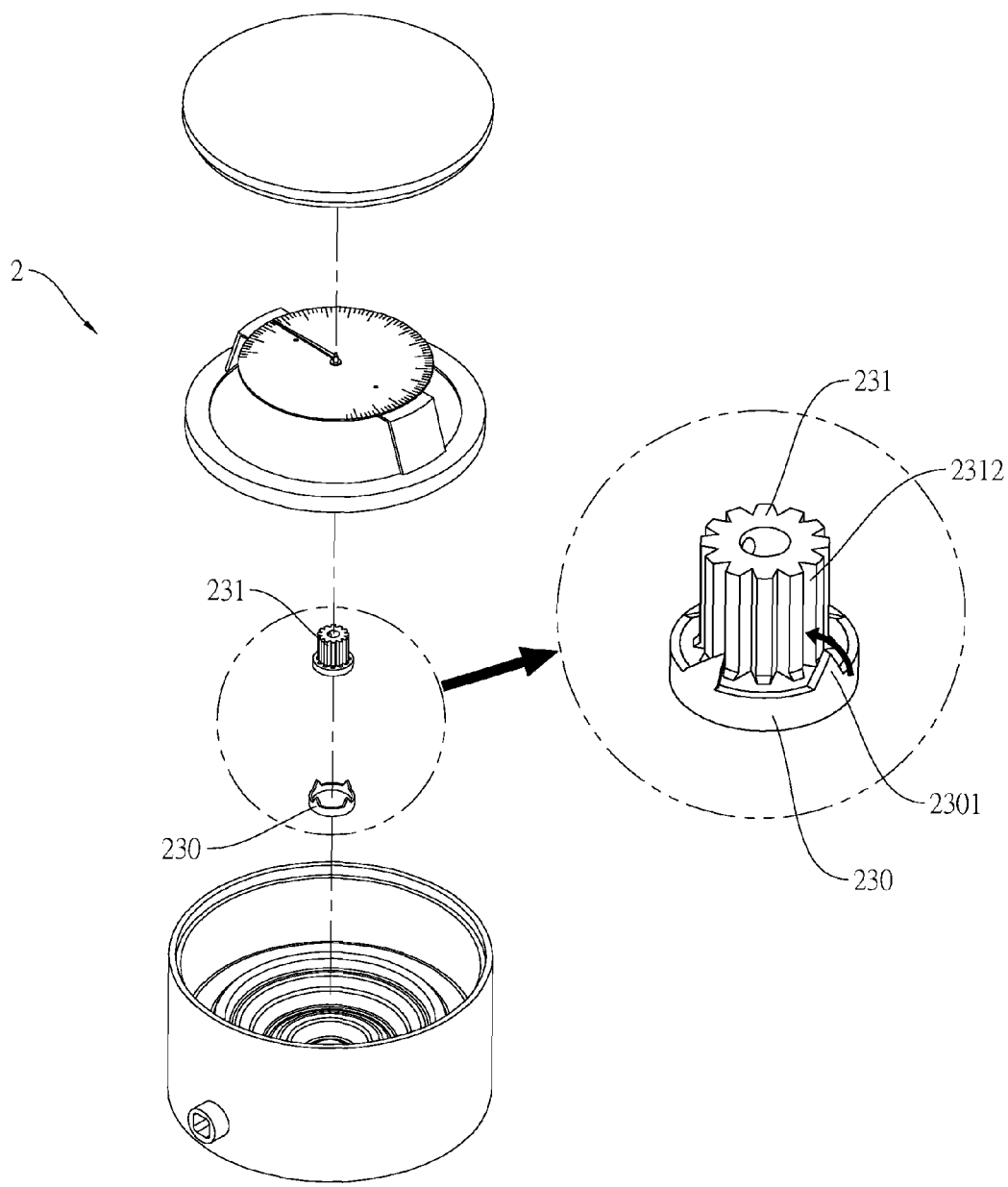
FIG. 5 is an exploded view of the pressure gauge showing another configuration of the seat and the insert.

Referring to FIG. 5, another configuration of the seat 230 and the insert 231 are shown. The seat 230 comprises four triangular protuberances 2301 spaced on an annular top edge and the hollow insert 231 comprises a plurality of longitudinal parallel ridges 2312 on an outer surface. The seat 230 and the insert 231 are fastened together in a friction fit. It is envisaged by the invention that a fine adjustment for calibration of the pointer 29 can be performed.

Figure 6:
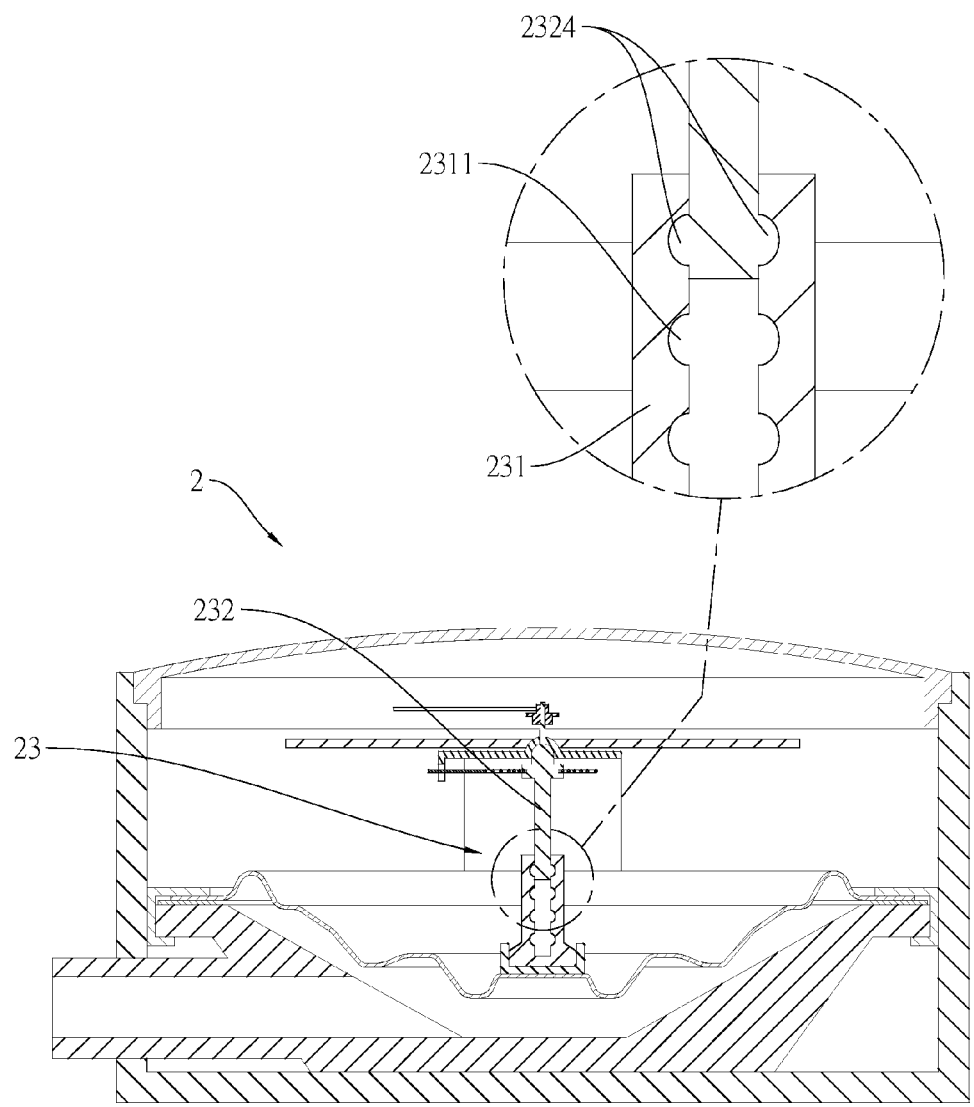
FIG. 6 is a longitudinal sectional view of the pressure gauge according to a second preferred embodiment of the invention.

Referring to FIG. 6, a pressure gauge 2 in accordance with a second preferred embodiment of the invention is shown. The characteristics of the second preferred embodiment are substantially the same as that of the first preferred embodiment except the following: The insert 231 is provided with internal threads 2311 (e.g., double-threaded) and the shaft 232 is provided with two opposite projections 2324 on a lower portion of an outer surface. The projections 2324 are disposed in a space defined by the internal threads 2311 and are adapted to move along the internal threads 2311. The second preferred embodiment of the moveable assembly 23 is applicable for smaller or miniature pressure gauges 2.

Figure 7:
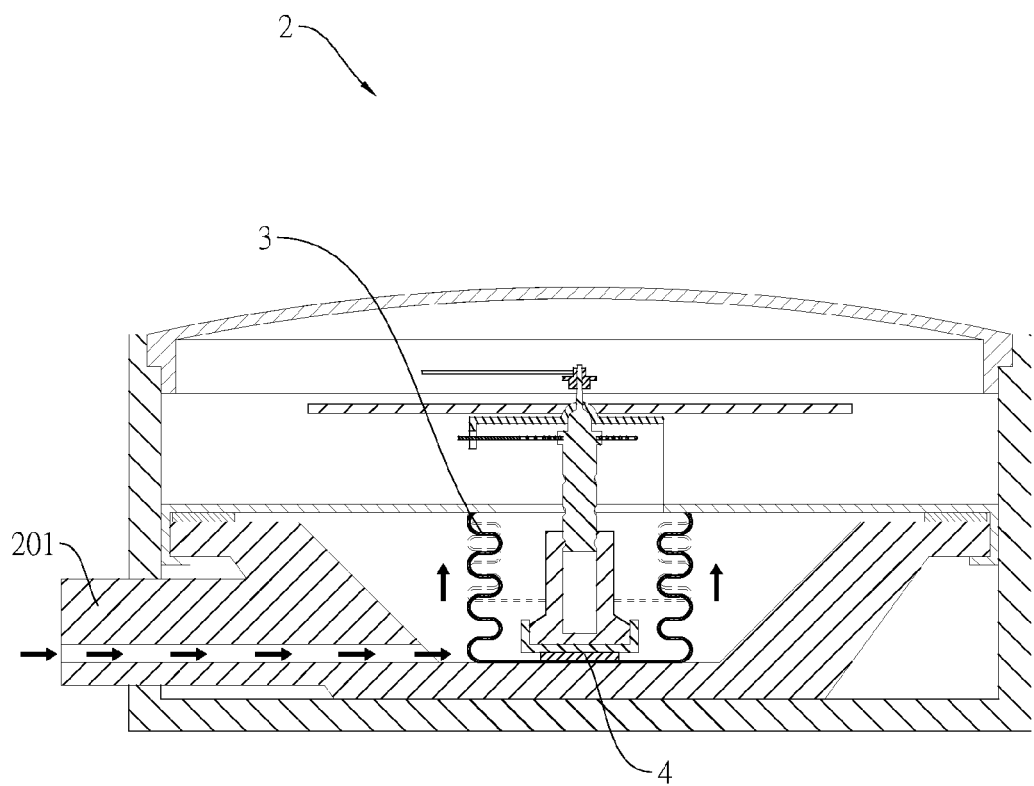
FIG. 7 is a longitudinal sectional view of the pressure gauge according to a third preferred embodiment of the invention.

Referring to FIG. 7, a pressure gauge 2 in accordance with a third preferred embodiment of the invention is shown. The characteristics of the third preferred embodiment are substantially the same as that of the first preferred embodiment except the following: The pressure measuring member is replaced with a bellows 3 and a raised member 4 is provided on a central portion of a bottom of the hollow of the bellows 3. In a pressure measuring operation, air is directed into the pressure gauge 2 via the pipe 201 to contract the bellows 3. The degree of contraction of the bellows 3 is proportional to the magnitude of the air pressure. The bellows 3 is a sensitive member and thus the pressure gauge 2 in accordance with the third preferred embodiment of the invention can be implemented as a pressure gauge for measuring small pressure (e.g., atmospheric pressure) changes.

Figure 8:
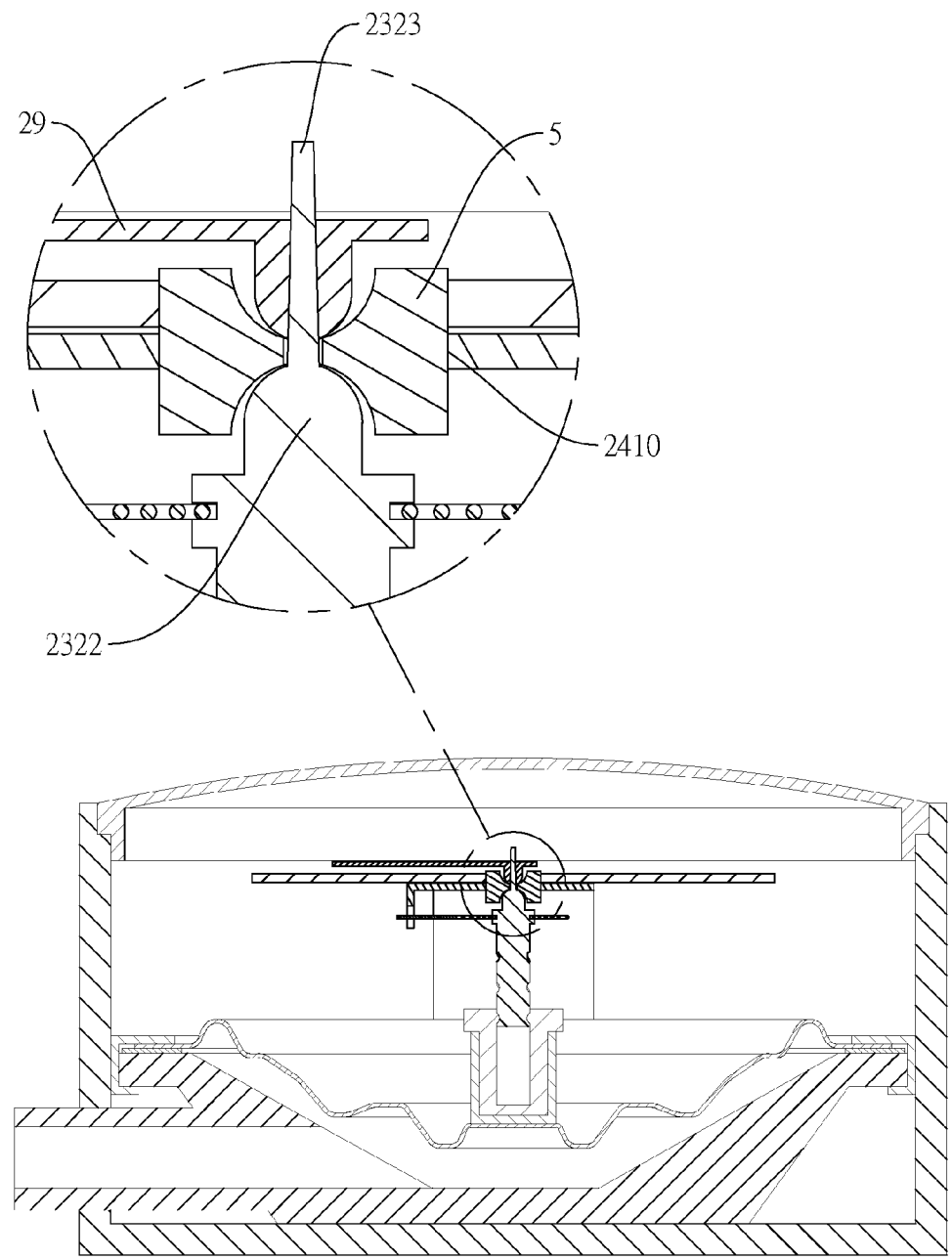
FIG. 8 is a longitudinal sectional view of the pressure gauge according to a fourth preferred embodiment of the invention.

Referring to FIG. 8, a pressure gauge in accordance with a fourth preferred embodiment of the invention is shown. The characteristics of the fourth preferred embodiment are substantially the same as that of the first preferred embodiment except the following: A channel member 5 is provided in the through hole 2410. The channel member 5 has a concave upper portion, a concave lower portion, and a tunnel-shaped intermediate portion. The axis 2323 of the protrusion 2322 passes through the intermediate and upper portions of the channel member 5 to be secured to the pointer 29. It is envisaged by the invention that the pointer 29 can pivot smoothly with reduced wear.

While the invention has been described in terms of preferred embodiments, those skilled in the art will recognize that the invention can be practiced with modifications within the spirit and scope of the appended claims.

What is claimed is:

1. A pressure gauge comprising:
   a base comprising an annular flange and a pipe for gas flow toward a bottom of the base;
   a padded ring rested upon the flange;
   a pressure measuring member having an uneven surface and pressed on the padded ring;
   a moveable assembly comprising a seat, a hollow insert, and a shaft wherein the seat is secured to a central portion of the pressure measuring member, the insert includes two opposite projections on a circular wall of a top opening, the insert is fastened in the seat, and the shaft includes external threads threadedly secured to the projections, an annular groove on an upper portion, a curved protrusion on a top, and an axis projects upward from the protrusion;
   a pointer having one end secured to an upper portion of the axis;
   a covering member comprises a ring member pressed on a peripheral portion of the pressure measuring member, and a raised bridge interconnecting opposite portions of the ring member and including a central through hole for allowing the axis to pass through, and a bent member;
   a balance spring disposed in the annular groove and having one end fastened in the bent member;
   a scale comprising a center hole aligned with the central through hole, the scale being rested upon the raised bridge;
   a housing; and
   a transparent cover secured to the housing for receiving the base, the padded ring, the pressure measuring member, the moveable assembly, the pointer, the covering member, the balance spring, and the scale.

2. The pressure gauge of claim 1, wherein the seat comprises a plurality of protuberances spaced on an annular top edge, and the insert comprises a plurality of longitudinal parallel ridges on an outer surface.

3. The pressure gauge of claim 1, wherein the insert is made of plastic.

4. The pressure gauge of claim 1, wherein the external threads are double-threaded.

5. The pressure gauge of claim 1, wherein the pressure measuring member is a diaphragm.

6. The pressure gauge of claim 1, wherein the pressure measuring member is a bellows.

7. The pressure gauge of claim 6, further comprising a raised member on a central portion of a bottom of the bellows.

8. The pressure gauge of claim 1, further comprising a channel member disposed in the through hole.

9. A pressure gauge comprising:
   a base comprising an annular flange and a pipe for gas flow toward a bottom of the base;
   a padded ring rested upon the flange;
   a pressure measuring member having an uneven surface and pressed on the padded ring;
   a moveable assembly comprising a seat, a hollow insert, and a shaft wherein the seat is secured to a central portion of the pressure measuring member; and the insert includes internal threads, the shaft includes two opposite projections on a lower portion of an outer surface, the projections are disposed in a space defined by the internal threads and are capable of moving along the internal threads, an annular groove on an upper portion, a curved protrusion on a top, and an axis projects upward from the protrusion;
   a pointer having one end secured to an upper portion of the axis;
   a covering member comprises a ring member pressed on a peripheral portion of the pressure measuring member, and a raised bridge interconnecting opposite portions of the ring member and including a central through hole for allowing the axis to pass through, and a bent member;
   a balance spring disposed in the annular groove and having one end fastened in the bent member;

a scale comprising a center hole aligned with the central through hole, the scale being rested upon the raised bridge;

a housing; and a transparent cover secured to the housing for receiving the base, the padded ring, the pressure measuring member, the moveable assembly, the pointer, the covering member, the balance spring, and the scale.

10. The pressure gauge of claim 8, wherein the seat comprises a plurality of protuberances spaced on an annular top edge, and the insert comprises a plurality of longitudinal parallel ridges on an outer surface.

11. The pressure gauge of claim 9, wherein the insert is made of plastic.

12. The pressure gauge of claim 9, wherein the internal threads are double-threaded.

13. The pressure gauge of claim 9, wherein the pressure measuring member is a diaphragm.

14. The pressure gauge of claim 9, wherein the pressure measuring member is a bellows.

15. The pressure gauge of claim 14, further comprising a raised member on a central portion of a bottom of the bellows.

16. The pressure gauge of claim 9, further comprising a channel member disposed in the through hole.

* * * * *